(12) United States Patent
Howard

(10) Patent No.: US 10,302,320 B2
(45) Date of Patent: May 28, 2019

(54) PORTABLE SOLAR HVAC SYSTEM WITH ALL-IN-ONE APPLIANCES

(71) Applicant: Reginald Bertram Howard, Brown Deer, WI (US)

(72) Inventor: Reginald Bertram Howard, Brown Deer, WI (US)

(73) Assignee: Reginald B. Howard, Brown Deer, WI (US)

( * ) Notice: Subject to any disclaimer, the term of this patent is extended or adjusted under 35 U.S.C. 154(b) by 140 days.

(21) Appl. No.: 15/293,226

(22) Filed: Oct. 13, 2016

(65) Prior Publication Data

US 2017/0108233 A1 Apr. 20, 2017

Related U.S. Application Data

(60) Provisional application No. 62/244,099, filed on Oct. 20, 2015.

(51) Int. Cl.
*F24F 5/00* (2006.01)
*F24F 11/56* (2018.01)
(Continued)

(52) U.S. Cl.
CPC .......... *F24F 5/0096* (2013.01); *F24F 5/0017* (2013.01); *F24F 5/0042* (2013.01);
(Continued)

(58) Field of Classification Search
CPC .. F24F 5/0096; F24F 11/56; F24F 2005/0067; F24F 2221/125; F24F 2221/12; F24F 2221/183; F24F 2221/34; F24F 5/0042; F24F 13/222; F24F 5/0017; F24J 2/245; F24J 2/345; F24J 2/36; Y02B 40/18; Y02B 10/24; Y02B 10/20; Y02A 30/272;
(Continued)

(56) References Cited

U.S. PATENT DOCUMENTS

| 5,522,944 A | 6/1996 | Elazari |
| 5,924,415 A * | 7/1999 | Esteverena ............... F24J 2/02 126/681 |

(Continued)

*Primary Examiner* — Michael C Zarroli

(57) ABSTRACT

This invention relates to a portable or fixed solar powered heating ventilation air conditioner (HVAC) system. The disclosed invention consists of the following major components. 1) Solar Hot Water Tank/Storage Tank, 2) Solar Generator, 3) Solar HVAC Heat Exchanger Unit, 4) Solar Grill, 5) Wireless Network Energy Monitoring System and 6) Supervisor Control and Data Acquisition (SCADA) system. Also included is a list of appliances that the HVAC system can be configured to function as: a) refrigerator, b) air purifier/fan, c) pressure cooker, d) drink dispenser, and e) pressurized hot water supply. The HVAC system and above listed appliances is designed to be used in homes, businesses, camping, military, hospitals, FEMA and in developing countries with very little electrical or plumbing infrastructure. The HVAC is capable of supplying all the above mention functions while being powered solely on solar power, solar hot water/fluid or geothermal and a chilled water source, therefore creating a NetZero Energy Machine™ that required no power from a utility grid when properly sized.

4 Claims, 14 Drawing Sheets

(51) Int. Cl.
*F24F 13/22* (2006.01)
*F24S 10/70* (2018.01)
*F24S 20/50* (2018.01)
*F24S 60/30* (2018.01)
*F28D 20/00* (2006.01)
*H01M 10/46* (2006.01)

(52) U.S. Cl.
CPC .......... *F24F 13/222* (2013.01); *F24S 10/742* (2018.05); *F24S 20/50* (2018.05); *F24S 60/30* (2018.05); *F28D 20/0034* (2013.01); *F24F 11/56* (2018.01); *F24F 2005/0067* (2013.01); *F24F 2221/12* (2013.01); *F24F 2221/125* (2013.01); *F24F 2221/183* (2013.01); *F24F 2221/34* (2013.01); *F28D 2020/0026* (2013.01); *F28D 2020/0078* (2013.01); *F28D 2020/0082* (2013.01); *H01M 10/465* (2013.01); *H01M 2220/10* (2013.01); *Y02A 30/272* (2018.01); *Y02B 10/20* (2013.01); *Y02B 10/24* (2013.01); *Y02E 10/44* (2013.01); *Y02E 60/142* (2013.01); *Y02E 60/147* (2013.01); *Y02E 70/30* (2013.01)

(58) Field of Classification Search
CPC ..... Y02E 60/147; Y02E 60/142; Y02E 70/30; Y02E 10/44; H01M 10/465; H01M 2220/10; F28D 2020/0082; F28D 2020/0078; F28D 2020/0026; F28D 20/0034
See application file for complete search history.

(56) References Cited

U.S. PATENT DOCUMENTS

| | | | |
|---|---|---|---|
| 6,037,567 A | 3/2000 | Yoshimitsu | |
| 6,257,227 B1 | 7/2001 | Harbin | |
| 7,781,913 B2 | 8/2010 | Wang | |
| 8,359,124 B2 * | 1/2013 | Zhou | G05B 13/024 700/276 |
| 8,457,802 B1 * | 6/2013 | Steven | G06Q 10/00 700/291 |
| 9,857,810 B2 * | 1/2018 | Smith, Jr. | G05D 23/27 |
| 2011/0017679 A1 * | 1/2011 | Zwern | C02F 1/04 210/767 |
| 2013/0199516 A1 * | 8/2013 | Snyder | F24J 2/04 126/633 |
| 2016/0161150 A1 * | 6/2016 | Zintel | F24J 2/02 126/643 |

* cited by examiner

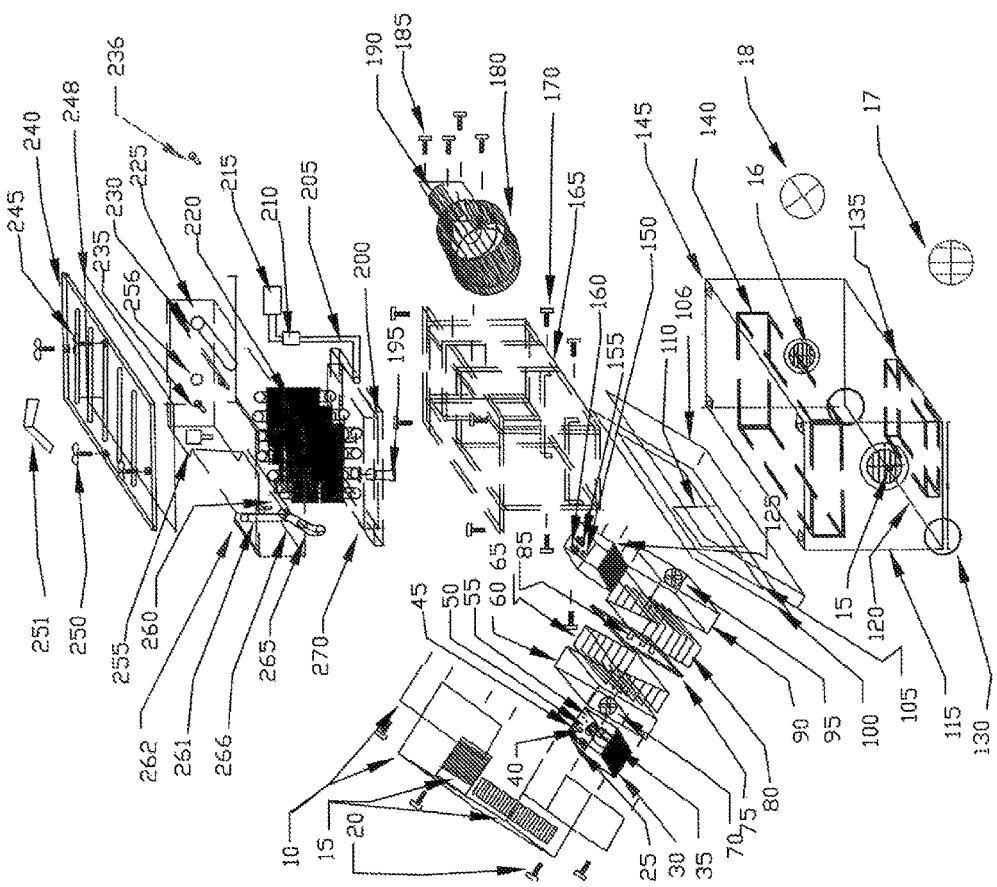
FIG. 1 PORTABLE SOLAR HVAC ASSEMBLY

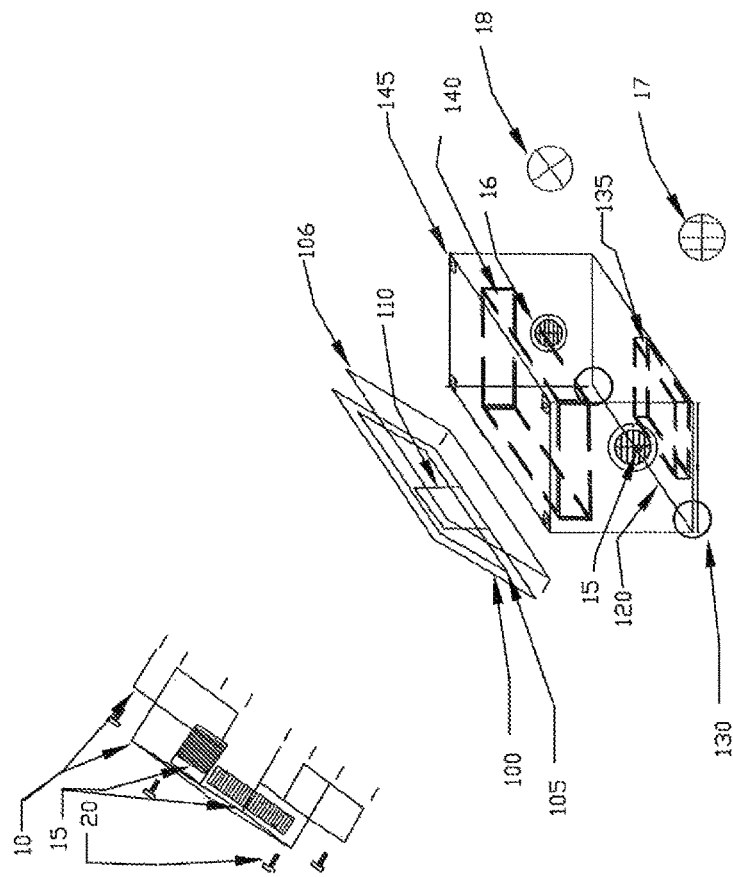
FIG. 2 HVAC ENCLOSURE

Notes:

10. Equipment Enclosure Cover
15. Air Vents
16. Outlet Vents
17. Air Filter
18. Vent Block
20. Mounting Screw for Equipment Cover
25. Receptacle
30. Inverter Enclosure
35. InverterCircuit Board
40. Cigarette Lighter
45. USB Ports
50. Power Switch
55. DC Power Post
60. Exhaust Fan Enclosure
65. Finned Heat Sink
70. CoolerFan
75. Insulation
80. Finned Heat Sink
85. Electricthermo Units
90. Cooling Fan Enclosure
95. Cooling Fan
100. Insulated Enclosure Top
105. Insulation
106. Lid Seal
110. Handle
115. Isulated Enclosure
120. Wheel Axle
125. Control Box Enclosure
130. Wheel
135. Lower Tank Insulation
140. Upper Tank Insulation
145. Frame Mounting Screw Holes
150. Control Power Switch
155. A/C Temp Controller
160. Hot Water Temp. Controller
165. Support Frame
170. Screws for Frame Cross Bars
180. Blower Cage Fan
185. Blower Mounting Screws
190. Fan Blower Motor
195. Outlet Faucet
200. Drip Pan
205. Water Line
210. Fluid Pump
215. Water Bottle
220. Finned Heat Exchange Pipes
225. Upper Tank
230. Electric Heating Element
235. Thermocouple
236. Room Thermocouple Sensor
240. Tank Top
245. Grill Surface
246. Grill Cover
247. Cover Hinge
248. Tank Top Seal
250. Tank Top Mounting Screws
251. Hinge Clips
255. Fluid Level Sensor
260. Inlet Faucet
261 Vent Valve
262. Vent Pipes
265. Pressure Valve
266. Blocking Valve
270. Lower Tank

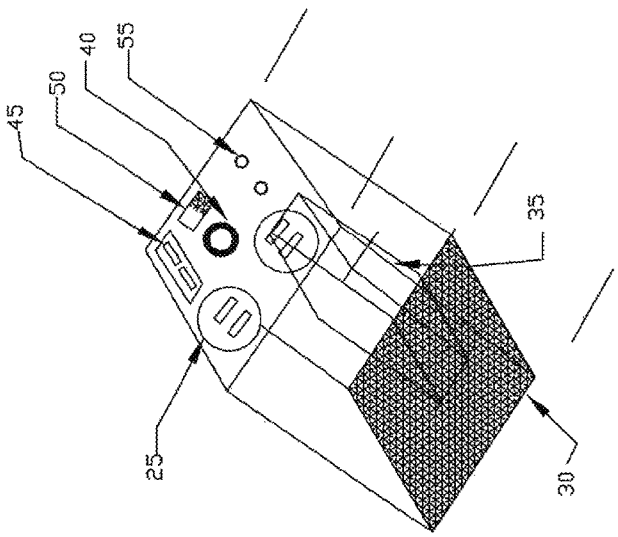

© 2014 Reginald Howard (17 U.S.C. 401) and "M"
Reginald Howard (17 U.S.C. 909)
FIG. 3  DC/AC Inverter Assy Notes:

10. Equipment Enclosure Cover
15. Air Vents
16. Outlet Vents
17. Air Filter
18. Vent Block
20. Mounting Screw for Equipment Cover
25. Receptacle
30. Inverter Enclosure
35. Inverter Circuit Board
40. Cigarette Lighter
45. USB Ports
50. Power Switch
55. DC Power Post
60. Exhaust Fan
65. Finned Heat Sink
70. CoolerFan
75. Insulation
80. Finned Heat Sink
85. Electricthermo Units
90. Cooling Fan Enclosure
95. Cooling Fan
100. Insulated Enclosure Top
105. Insulation
106. Lid Seal
110. Handle
115. Isulated Enclosure
120. Wheel Axle
125. Control Box Enclosure
130. Wheel
135. Lower Tank Insulation
140. Upper Tank Insulation
145. Frame Mounting Screw Holes
150. Control Power Switch
155. A/C Temp Controller
160. Hot Water Temp. Controller
165. Support Frame
170. Screws for Frame Cross Bars
180. Blower Cage Fan
185. Blower Mounting Screws
190. Fan Blower Motor
195. Outlet Faucet
200. Drip Pan
205. Water Line
210. Fluid Pump
215. Water Bottle
220. Finned Heat Exchange Pipes
225. Upper Tank
230. Electric Heating Element
235. Thermocouple
236. Rm Thermocouple
240. Tank Top
245. Grill Surface
246. Grill Cover
247. Cover Hinge
248. Tank Top Seal
250. Tank Top Mounting Screws
251. Hinge Clips
255. Fluid Level Sensor
260. Inlet Faucet
261. Vent Valve
262. Vent Pipes
265. Pressure Valve
266. Blocking Valve
270. Lower Tank

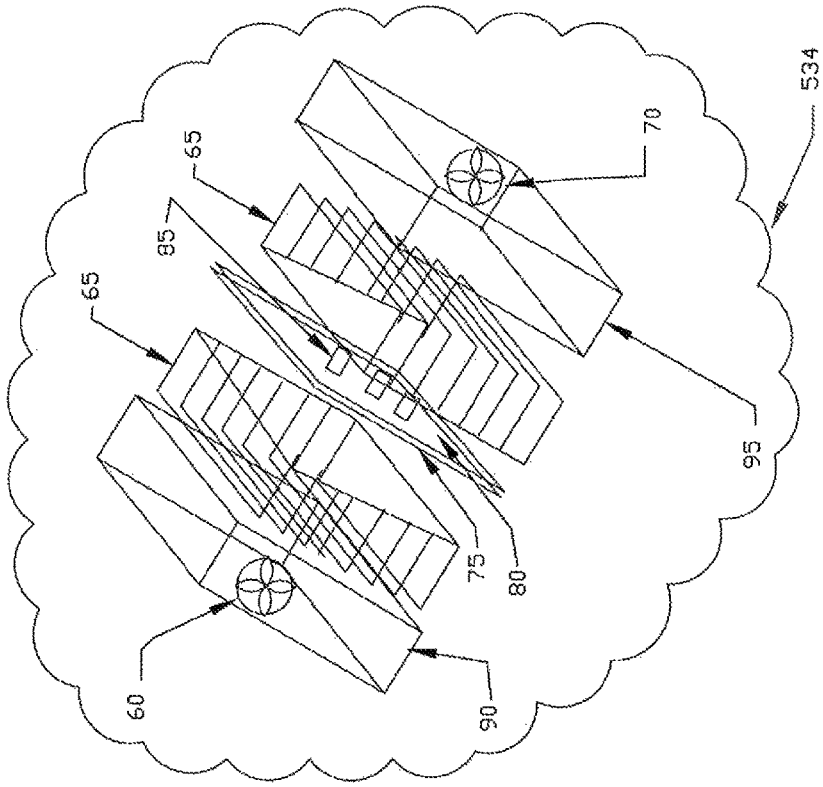

© 2014 Reginald Howard (17 U.S.C. 401) and "M"
Reginald Howard (17 U.S.C. 909)
FIG. 4 Thermoelectric Unit Assembly Notes:

10. Equipment
11. Enclosure Cover
15. Air Vents
16. Outlet Vents
17. Air Filter
18. Vent Block
20. Mounting Screw for Equipment Cover
25. Receptacle
30. Inverter Enclosure
35. Inverter Circuit Board
40. Cigarette Lighter
45. USB Ports
50. Power Switch
55. DC Power Post
60. Exhaust Fan Enclosure
65. Finned Heat Sink
70. CoolerFan
75. Insulation
80. Finned Heat Sink
85. Electricthermo Units
90. Cooling Fan Enclosure
95. Cooling Fan
100. Insulated Enclosure Top
105. Insulation
106. Lid Seal
110. Handle
115. Isolated Enclosure
120. Wheel Axle
125. Control Box Enclosure
130. Wheel
135. Lower Tank Insulation
140. Upper Tank Insulation
145. Frame Mounting Screw Holes
150. Control Power Switch
155. A/C Temp Controller
160. Hot Water Temp. Controller
165. Support Frame
170. Screws for Frame Cross Bars
180. Blower Cage Fan
185. Blower Mounting Screws
190. Fan Blower Motor
195. Outlet Faucet
200. Drip Pan
205. Water Line
210. Fluid Pump
215. Water Bottle
220. Finned Heat Exchange Pipes
225. Upper Tank
230. Electric Heating Element
235. Thermocouple
236. Rm Thermocouple
240. Tank Top
245. Grill Surface
246. Grill Cover
247. Cover Hinge
248. Tank Top Seal
250. Tank Top Mounting Screws
251. Hinge Clips
255. Fluid Level Sensor
260. Inlet Faucet
261. Vent Valve
262. Vent Pipes
265. Pressure Valve
266. Blocking Valve
270. Lower Tank

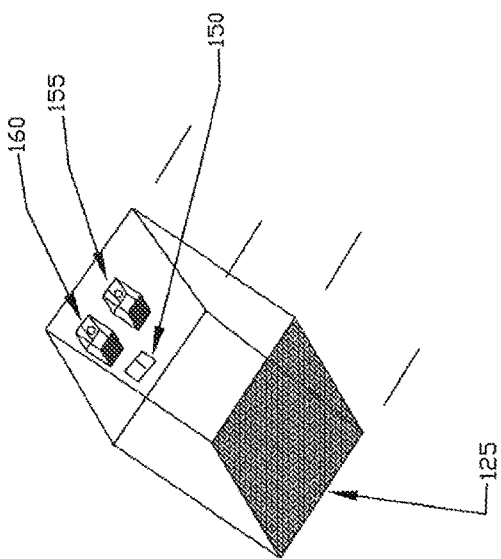

©2014 Reginald Howard (17 U.S.C. 401) and "M" Reginald Howard (17 U.S.C. 909)

FIG. 5 Control Unit Assembly

Notes:

- 10. Equipment Enclosure Cover
- 15. Air Vents
- 16. Outlet Vents
- 17. Air Filter
- 18. Vent Block
- 20. Mounting Screw for Equipment Cover
- 25. Receptacle
- 30. Inverter
- 35. Inverter Enclosure
- 35. Inverter Circuit Board
- 40. Cigarette Lighter
- 45. USB Ports
- 50. Power Switch
- 55. DC Power Post
- 60. Exhaust Fan
- 65. Finned Heat Sink
- 70. Cooler Fan
- 75. Insulation
- 80. Finned Heat Sink
- 85. Electric thermo Units
- 90. Cooling Fan
- 95. Cooling Fan Enclosure
- 100. Insulated Enclosure Top
- 105. Insulation
- 106. Lid Seal
- 110. Handle
- 115. Isulated Enclosure
- 120. Wheel Axle
- 125. Control Box
- 130. Wheel
- 135. Lower Tank Insulation
- 140. Upper Tank Insulation
- 145. Frame Mounting Screw Holes
- 150. Control Power Switch
- 155. A/C Temp Controller
- 160. Hot Water Temp. Controller
- 165. Support Frame
- 170. Screws for Frame Cross Bars
- 180. Blower Cage Fan
- 185. Blower Mounting Screws
- 190. Fan Blower Motor
- 195. Outlet Faucet
- 200. Drip Pan
- 205. Water/Fluid Line
- 210. Water/Fluid Pump
- 215. Water/Fluid Bottle
- 220. Finned Heat Exchange Pipes
- 225. Upper Tank
- 230. Electric Heating Element
- 235. Ht Exch Thermoco.
- 236. Room Thermocouple
- 240. Tank Top
- 245. Grill Surface
- 246. Grill Cover
- 247. Cover Hinge
- 248. Tank Top Seal
- 250. Tank Top Mounting Screws
- 251. Hinge Clips
- 255. Fluid Level Sensor
- 256. Pressure Sensor
- 260. Inlet Valve
- 261 Vent Valve
- 262 Vent Pipes
- 265. Pressure Valve
- 266. Blocking Valve
- 270. Lower Tank
- 539 Heat Exchg Assy

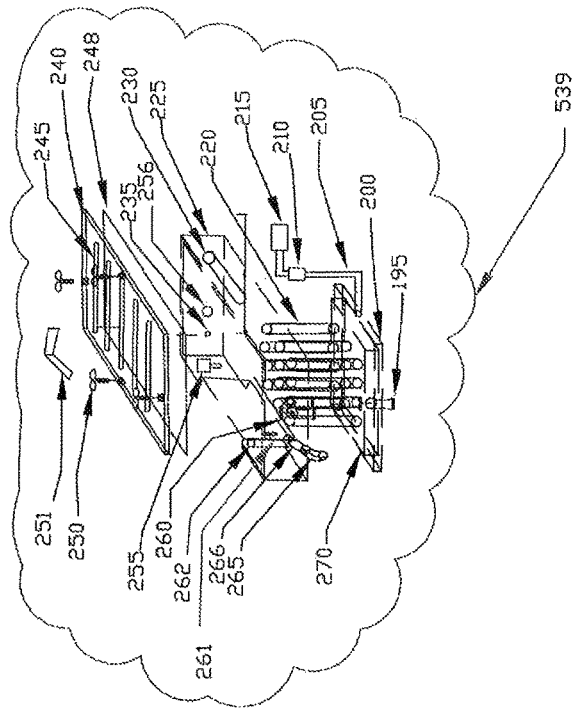

© 2014 Reginald Howard (17 U.S.C. 401) and "M"
Reginald Howard (17 U.S.C. 909)
FIG. 6 HEAT EXCHANGE ASSEMBLY

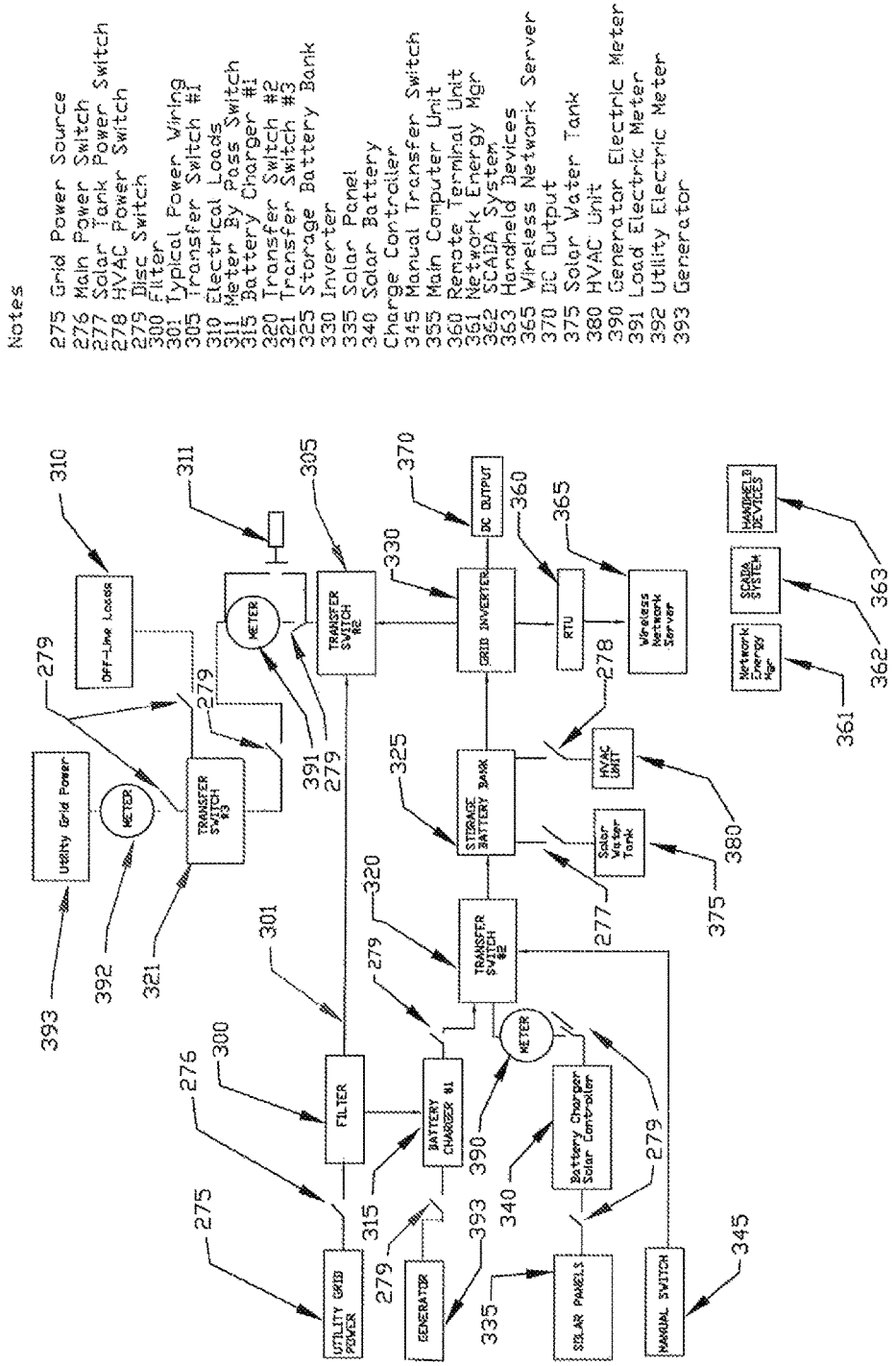
FIG. 7 SOLAR GENERATOR BLOCK DIAGRAM

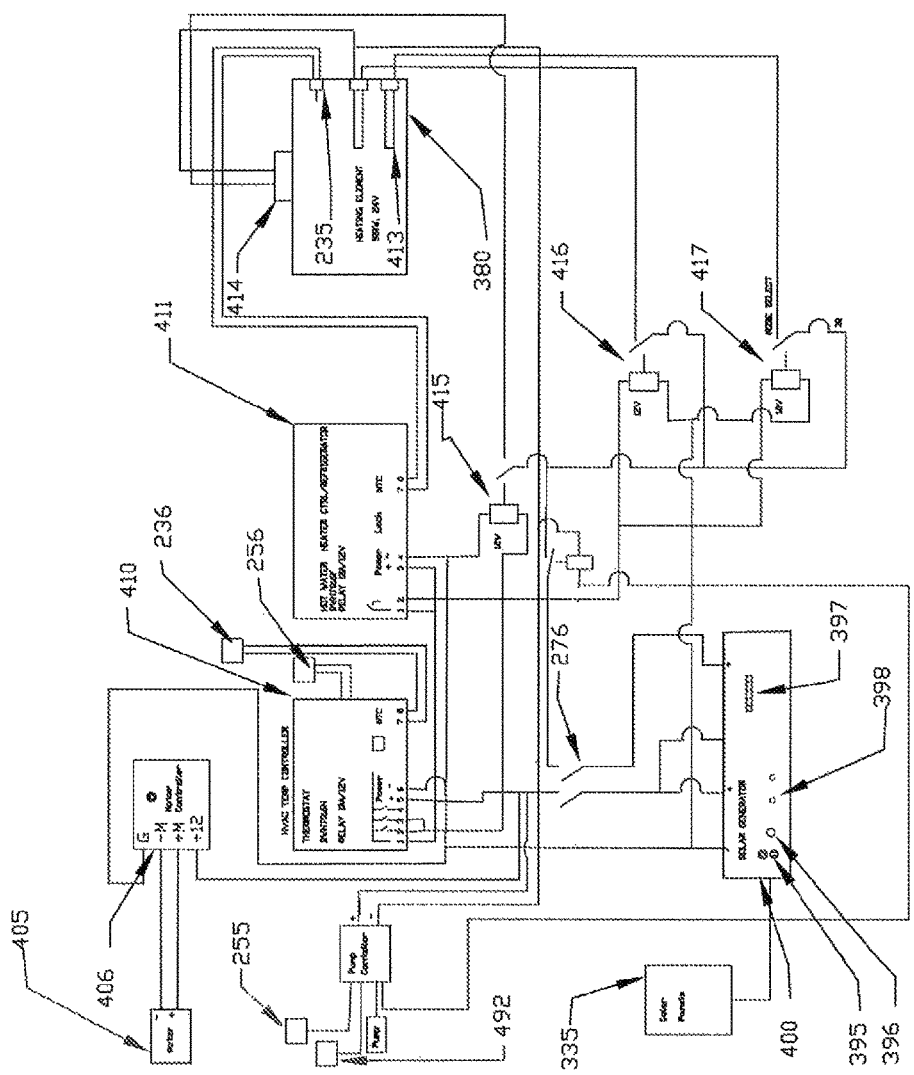
FIG. 8 OVERALL HVAC SYSTEM SCHEMATIC

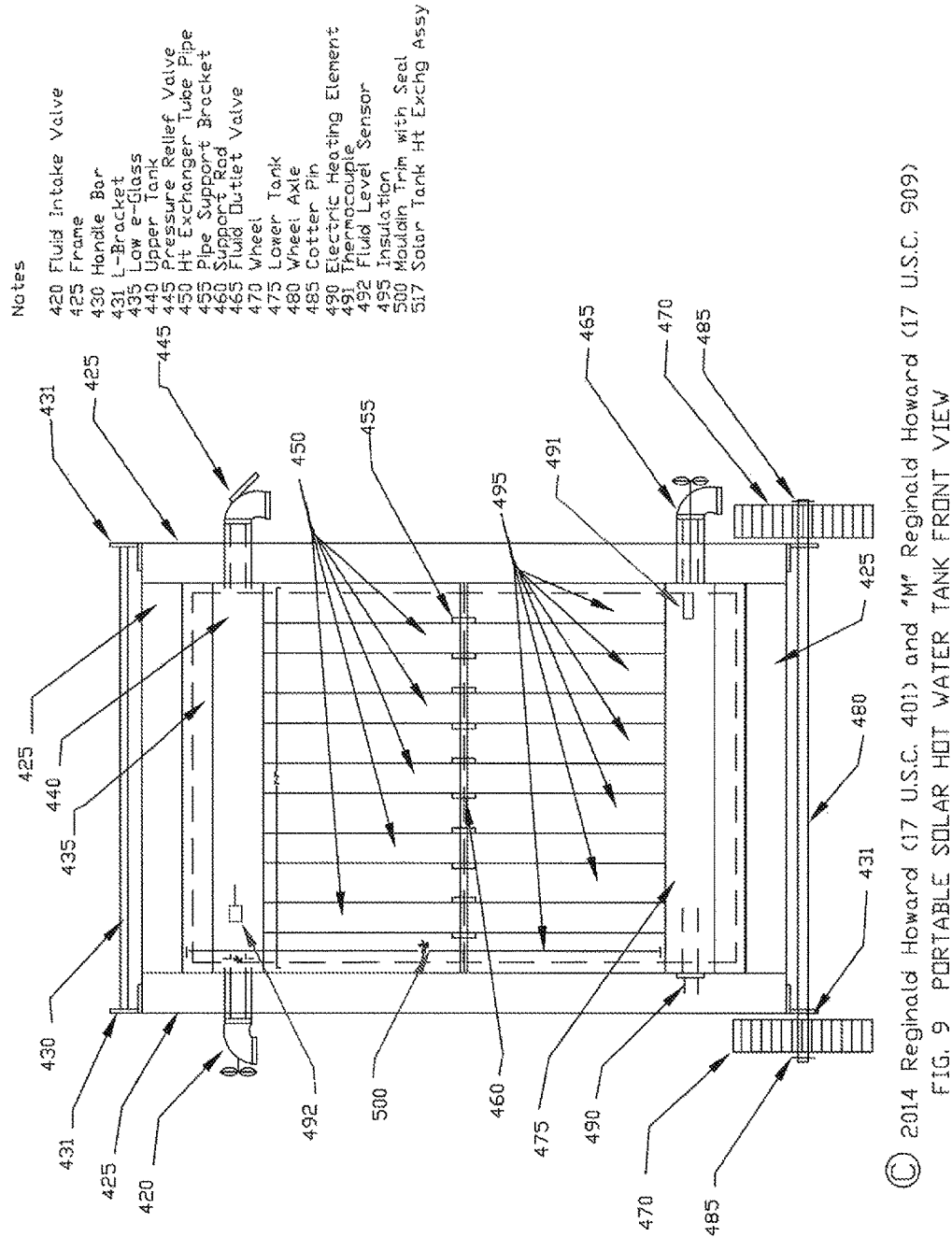
FIG. 9 PORTABLE SOLAR HOT WATER TANK FRONT VIEW

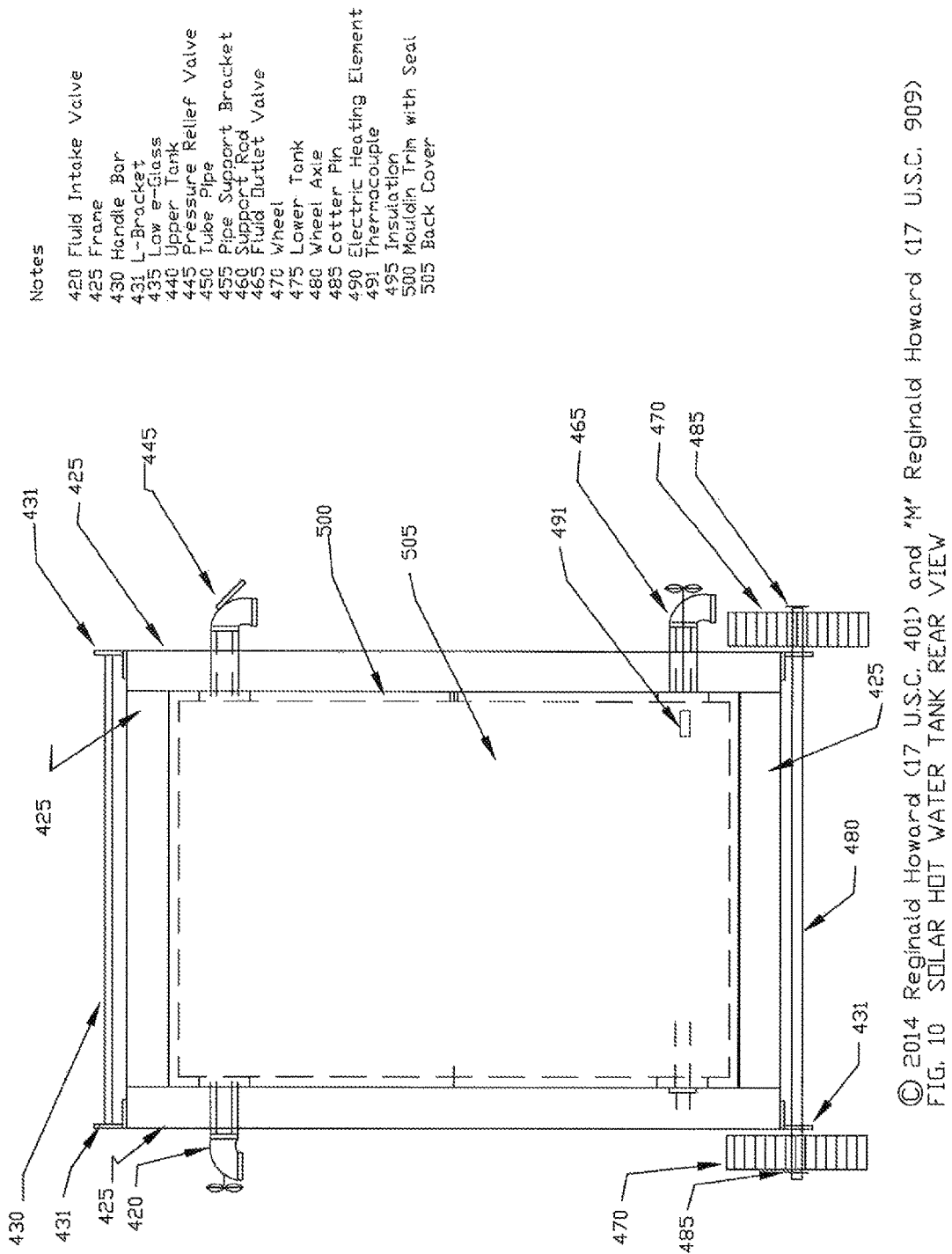
FIG. 10 SOLAR HOT WATER TANK REAR VIEW

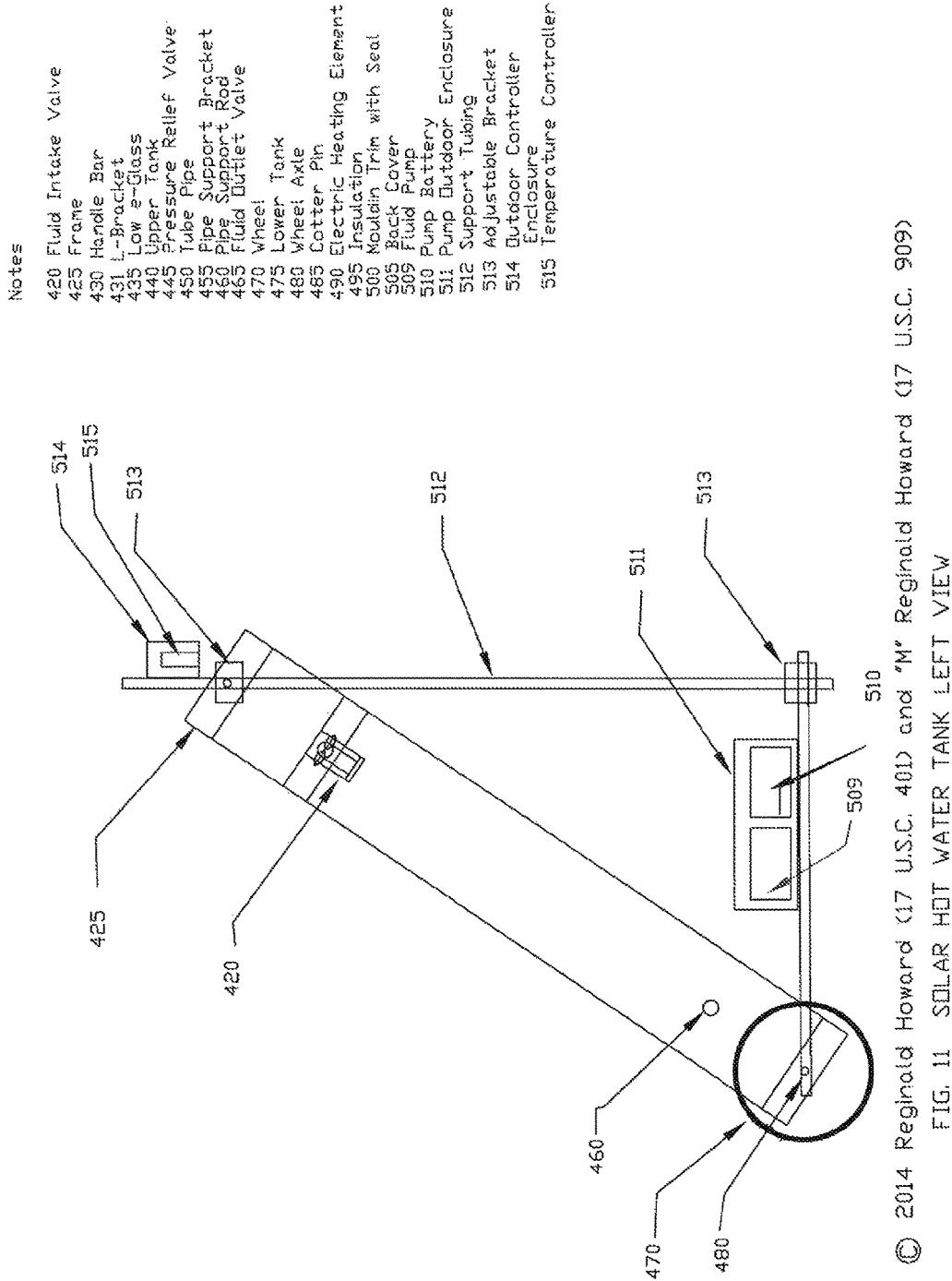
FIG. 11 SOLAR HOT WATER TANK LEFT VIEW

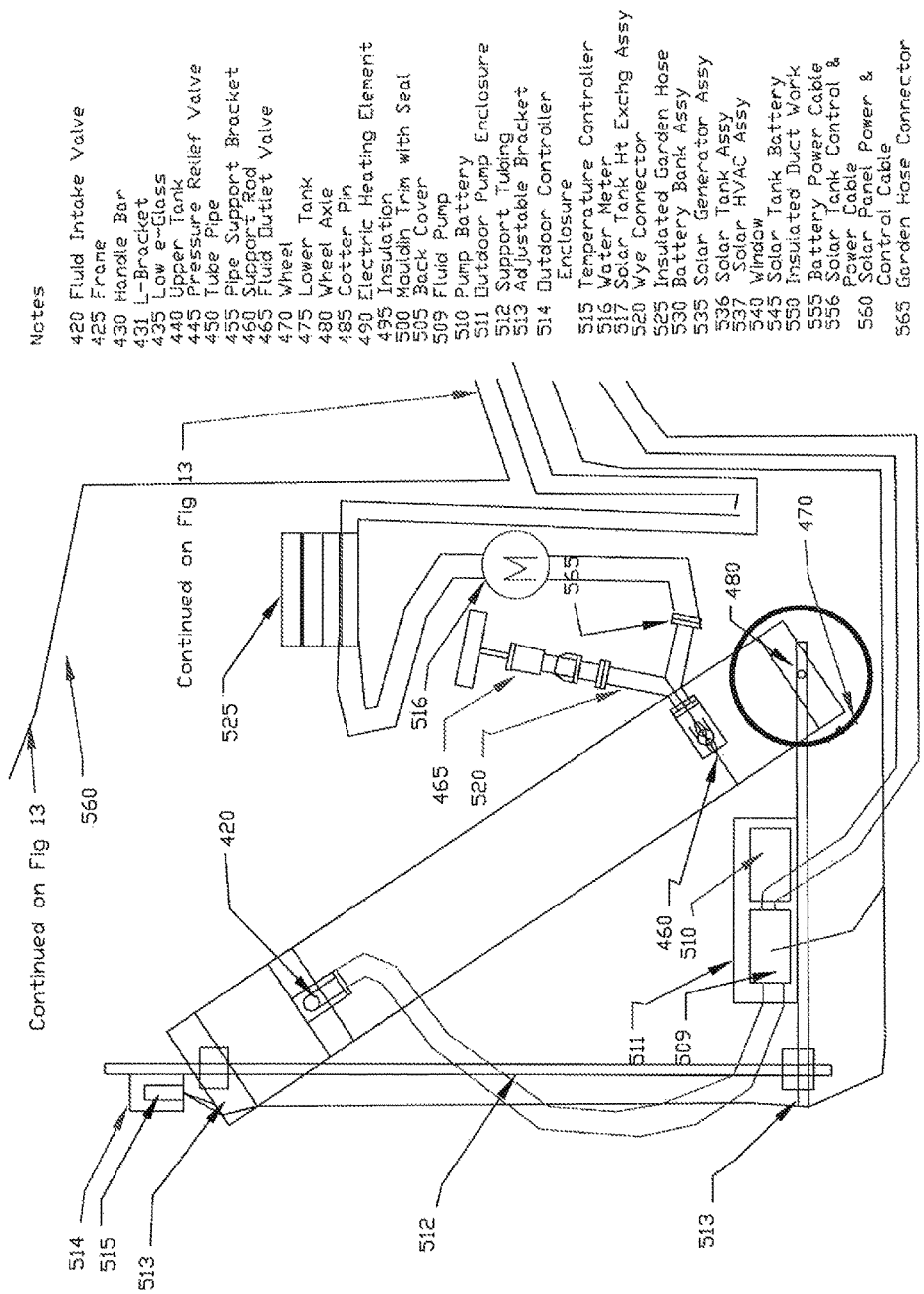
FIG. 12 SOLAR HOT WATER TANK RIGHT VIEW

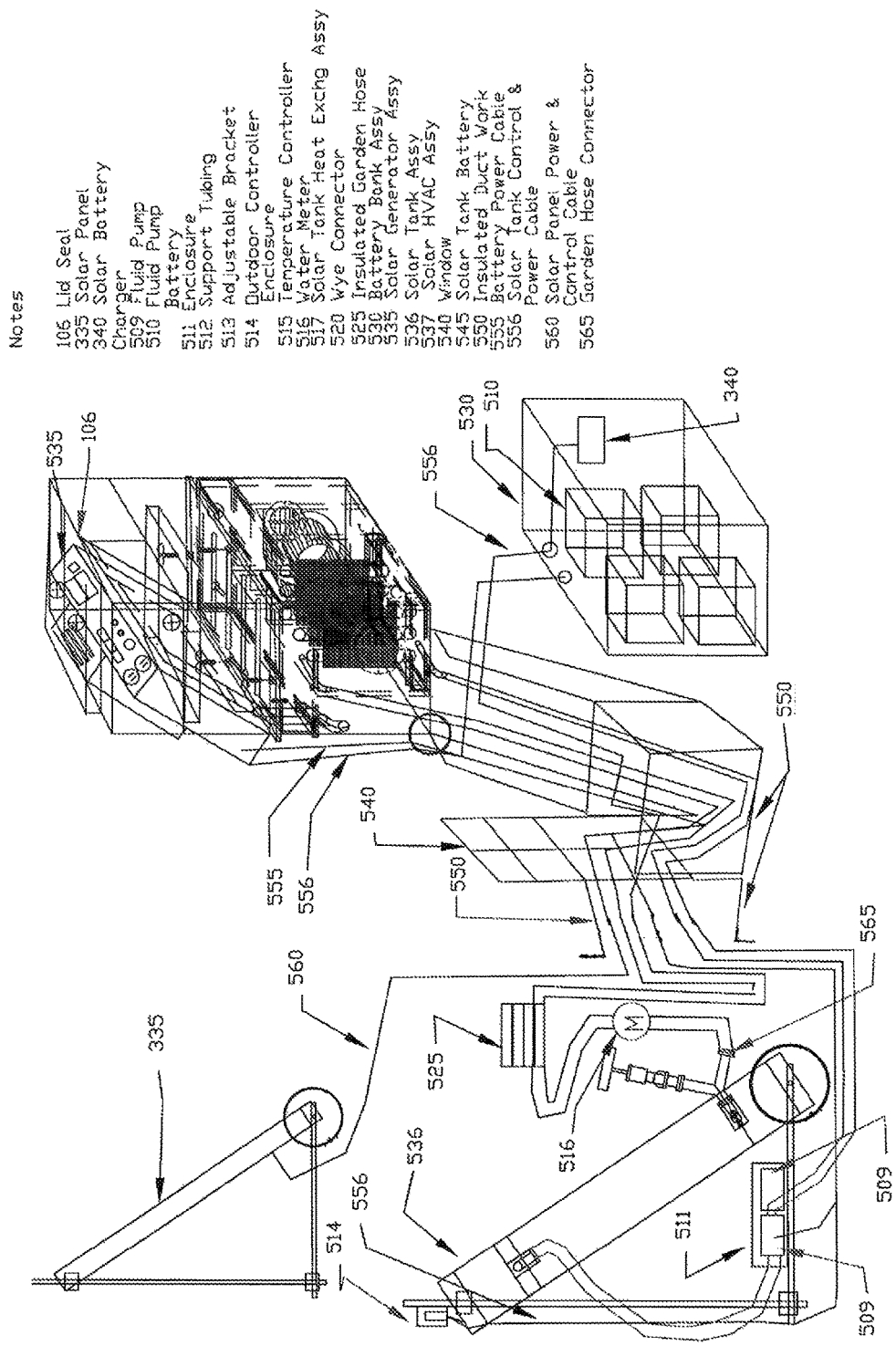
FIG. 13 PORTABLE SOLAR HVAC SYSTEM

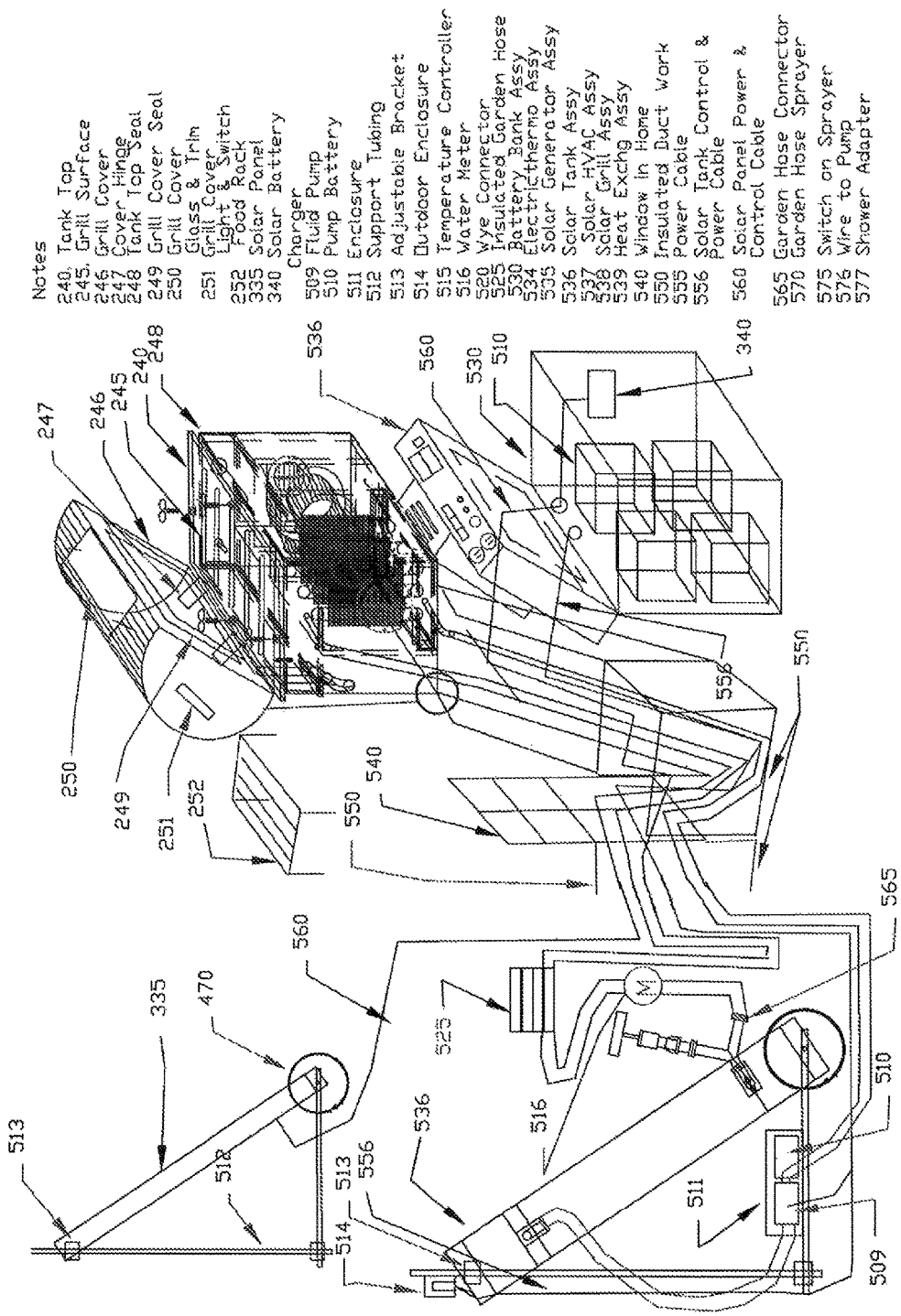
FIG. 14 PORTABLE SOLAR GRILL ASSY

PORTABLE SOLAR HVAC SYSTEM WITH ALL-IN-ONE APPLIANCES

CROSS-REFERENCE TO RELATED APPLICATIONS (MPEP 201.11)

None

STATEMENT REGARDING FEDERALLY SPONSORED RESEARCH OR DEVELOPMENT (MPEP 310)

None

THE NAMES OF THE PARTIES TO A JOINT RESEARCH AGREEMENT (37 CFR 1.71 (G)

None

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

None

MARGINS

The sheets must not contain frames around the sight (i.e., the usable surface), but should have scan target points (i.e., cross-hairs) printed on two cater-corner margin corners. Done

BACKGROUND OF THE INVENTION ((MPEP 608.01(c))

This invention was not made with government support. The government has no certain rights in the invention. A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever. U.S. Pat. No. 625,722 discloses an improvement useful with a portable or backyard-type barbecue grill that is used outdoors in backyards, camping, picnicking, or boating where hot water, steam, or power is not readily or conveniently available, U.S. Pat. No. 5,522,944 discloses an apparatus for converting solar energy to thermal and electrical energy including a substantially unsealed enclosure, an array of photovoltaic cells for converting solar energy to electrical energy located within an enclosure, and a plurality of interconnected heat collecting tubes located within the enclosure and disposed on the same plane as the array of photovoltaic cells for converting solar energy to thermal energy in a fluid disposed within the heat collecting tubes, U.S. Pat. No. 7,781,913 B2 disclose an uninterruptible power supply (UPS) including a first transfer switch, a first battery charger, a second transfer switch, a solar energy absorption board, and a second battery charger. The first transfer switch connects a power source to an electrical device. The first battery charger connects the power source to a storage battery for charging a storage battery. An output of the storage battery is connected to the first transfer switch via a DC/AC inverter. The first transfer switch controls the storage battery to supply power to electrical devices. The second transfer switch connects between the first battery charger and the storage battery. The second battery charger connects the solar energy absorption board to the second transfer switch. The second transfer switch controls the power source to charge the storage battery. U.S. Pat. No. 6,037,567 discloses a vehicle air-conditioning system includes electric heating devices to accelerate a rise in temperature of air for heating a passenger compartment by accelerating a rise in temperature of warm water used to heat the air and by directly heating the air. Electric heating devices are built into a heat exchanger for heating so that the devices can release heat into surrounding air through radiating fins. When the system is in a heating operation region and the temperature of warm water available to flow through the heat exchanger is below a set temperature T2, the electric heating devices are turned on. A blower for blowing heating air into a passenger compartment through the heat exchanger is stopped, and a warm water valve is opened to allow the warm water to flow through the heat exchanger, whereupon heat from the electric heating devices is released through the radiating fins into the warm water inside the heat exchanger. When the temperature of the warm water rises above the set temperature T2, the blower starts, and heat from the electric heating devices is released through the radiating fins into the air blown by the blower. United States Patent 2010/003,7888 discloses, a system for heating water including a water heater and a solar collector is provided. The water heater includes a water storage tank, a heating element positioned within the bottom end of the water tank and a lower thermostat Configured to selectively activate the heating element as a function of the water temperature sensed by the temperature sensor of the thermostat. A tank heat exchanger is also positioned within the bottom end portion of the water storage tank. The tank heat exchanger is configured to contain a fluid medium for heat exchange with water in the bottom end portion of the water storage tank. The solar collector is fluidly coupled to the tank heat exchanger of the water heater for circulating the fluid medium through the tank heat exchanger.

The above mentioned competitor's patents offer an independent solution to solar heating, air conditioning, hot water grill and an UPS. However, none of the competitor's offers a complete portable solar powered heating ventilation and air conditioning (HVAC) system with built-in all-in-one multiple appliances with wireless (or hardwired) network energy monitoring system and with a supervisory control and data acquisition systems. In addition to providing a portable fully functional HVAC system the system can be configured to perform the functions of the following appliances: a) means to heat, b) means for air conditioning, c) means for refrigeration, d) means for air purification, e) means for circulating air, f) means for cooking grill, g) means for pressure cooking, h) means for a drink dispenser, i) means for pressurized fluid supply, This portable HVAC system combines several energy technologies to produce what is believed to be the most efficient energy saving machine on the HVAC market today. The HVAC system needs to be connected to a combination of energy sources consisting of photovoltaic panels, solar hot water tank or geothermal and a chilled water source e.g. Home tap water, good water or similar clean water sources even lake water. In fact, a properly sized solar battery bank, solar panels, and solar hot water system and chilled water from a home tap water can create a NetZero Energy Machine where the unit can satisfy all of a user's electricity needs, hot water needs, cooking energy needs, air conditioner needs, heating needs, and refrigeration energy needs without requiring any connection to a utility electric grid. However, a grid connection is available as an option for those customers that may not live in a location where the sunlight maybe limited. The best application for this HVAC system is intended to be utilized in a living room in a home or apartment, business office space, campers in the field, military field personnel, FEMA, hospitals for quarantine patience's, people in developing countries with limited or no plumbing and/or electrical infrastructure.

BRIEF SUMMARY OF INVENTION

Description

The solar powered HVAC with multiple appliances consist of the following major components. 1) Solar Hot Water Tank/Storage Tank, 2) Solar Generator, 3) Solar powered HVAC Unit, 4) Wireless Network Energy Monitoring System and 5) Supervisor Control and Data Acquisition (SCADA) system. Also included are the following list of appliances that the HVAC system can be configured to function as: a) refrigerator, b) air purifier with fan, c) pressure cooker, d) drink dispenser, and e) portable pressurized hot water supply. 1) The solar water/fluid tank is on wheels and can be cascaded together using garden type hoses or optional fix pipe to create any size hot water tank or storage tank. It also has its own fluid/water pump, electric heating elements, thermocouple, battery, water meter and temperature control unit with wireless network (or hardwired) communications to the main HVAC unit controller. The solar hot water tank's main function is to generate hot water from the sun's radiation or use its own electric heating elements to provide hot water to the main HVAC unit for heating. The solar hot water tank has a pressure relief valve, an input valve and outlet valve with standard type garden hose connectors (optional fix pipe for all connection) that allow a garden hose rated for hot water to be connected to corresponding input valve and outlet valves of the main HVAC unit completing a closed loop system. Furthermore, the solar water/fluid tank can be configured to operate as a standalone unit to provide an independent supply of pressurized hot water via a garden hose with a sprayer or shower adapter attached. To receive water or a fluid from a pressurized source, the inlet valve has a wye hose connector with an electric controlled valve that is controlled either by the local controller on the solar water/fluid tank or by the HVAC controller when the solar tank is part of the HVAC system. When the solar tank is part of the HVAC system the water/fluid level sensor is monitored by the HVAC controller. Therefore, if the preset water/level L1 in the solar water/fluid tank drops below level L1, the HVAC controller will open the electric valve on the intake valve to allow pressurized water/fluid to fill the tank to a preset level L2. 2) The solar generator operates as a portable solar generator, and optional uninterruptible power supply to provide alternating current and alternating voltage to electrical loads. The solar generator is the main power source for the HVAC unit and solar hot water tank. The unit has two ways to charge a bank of solar storage batteries. The first method is via an automatic transfer switch with inputs from a solar battery charger and second input from a filtered utility grid power source. The output of the first automatic transfer switch connects to a bank of solar storage batteries to provide it with the choice of charging with photovoltaic cells or grid power. When no solar energy from the sun is available or the batteries charge level is low, the unit switches automatically to the utility grid power source. There is also a manual switch for manually switching the first transfer switch from either solar power or grid power. There is a connector for connecting an external generator to the first transfer switch. A second automatic transfer switch provides electrical loads with a choice of utility grid power source or AC power from a DC/AC inverter. The DC/AC inverter also provides DC power and universal serial bus (USB) power. The charging status of the battery and modes of operation of the solar generator is monitored remotely via wireless or wired network with a Supervisory Control Data Acquisition system. 3) The Solar Powered HVAC unit has an insulated enclosure with a heat exchanger that consist of a plurality of rows of vertically mounted finned pipes that are connected to an upper and lower tank. The upper tank is separated from the lower tank by a plurality of finned tubes fluidly and mechanically connected to both the upper and lower tank. The upper tank has a thermocouple sensor and an electric heating element mechanically mounted inside the tank. The upper tank also has a garden hose type intake valve with a wye connector valve, a pressure relief valve with a valve controlled vent pipe. In the heating mode, the HVAC unit receives hot water via a water/fluid pump mounted either on the solar hot water tank or mounted on the HVAC unit that pumps water or a fluid into the intake wye valve or as an option the unit can receive water/fluid from an alternate pressurized fluid source connected to the wye valve. The lower tank has an outlet valve and garden hose connection back to the intake valve of the solar water/fluid tank to complete a closed fluid system. The HVAC temperature controllers monitor the temperature (T1) of the water in the solar water/fluid tank and the temperature of water in the HVAC upper tank T3. If T1 temperature is lower than its preset temperature T2, and T3 temperature is below its preset temperature T4, then the HVAC unit will activate its heating elements to bring the water temperature T3 to a preset temperature T4. If the temperature T1 of the water in the solar tank is equal to or greater than its preset T2 temperature, and temperature of the HVAC tank is below T4, after a preset check temperature time, then the HVAC temperature controller will activate the water/fluid pump for a predetermined amount of time (t) to refill the HVAC tank with water/fluid from the solar water/fluid tank. A water level sensor checks located in the upper tank of the heat exchanger monitor the water/fluid level in the HVAC upper tank. If the water/fluid level in the upper tank of the HVAC system drops below a preset level L3 then the water level controller will open the electric valve on the wye connector on intake of the valve HVAC system to allow a pressurized water/fluid source to fill the upper tank to a preset level L4. Alternately the water level controller can also activate the solar water/fluid tank pump to fill the HVAC upper tank with water/fluid from the solar water/fluid tank. The HVAC unit can also be optionally configured to operate with large external fluid storage tank when configured for large residential or commercial sized systems. When external storage tanks are utilized, they become a temporary holding place to store hot water/fluid from the solar hot water/fluid tanks before pumping the water/fluid into the HVAC heat exchanger and then back to another storage tank before being pump back into a solar hot water/fluid tank for reheating. In the heating mode of the HVAC system, heat is generated as result of hot water inside of the heat exchanger transferring heat to the finned heat exchanger pipes. There is a fan blower that is activated at a preset outside temperature T5. The activation of the fan blower causes outside air to be drafted into the intake vents and blown across a plurality of finned pipes. The outside air is heated via convection as air passes across the fined pipes as a result of the finned pipes radiating heat when filled with hot water/fluid. The heated air exits the unit through outlet vent. In the air conditioning mode, a thermoelectric cooling generator unit is mounted inside the lid of the HVAC enclosure. The thermoelectric unit provides cooling as result of the thermoelectric effect. This effect happens when a difference in voltage across a material of different Serbect coefficient (N-doped, P-doped) semiconductors produces a temperature difference where absorb heat flows from one side of the junction making one side of the junction cool and the other side warm. The cool side of the thermoelectric unit is facing toward the opened upper tank with a fan that circulates cool air inside the heat exchanger. In this mode, the grill tank top of the heat exchanger is removed. Air circulates inside the heat exchanger by the thermoelectric unit's fan and cools the finned pipes of the heat exchanger by absorbing thermal energy from the finned pipes. The air condition air flow process is the same as describe above for the heating mode, except the intake air is warm and flows across cold finned pipes of the heat exchanger therefore cooling the air before exiting at the outlet vent. To enhance cooling, ice cubes can be added to the heat exchanger pipes of the upper tank which also fills the lower tank with ice. 4) The Solar Powered Grill requires the solar generator enclosure top to be removed. A grill cover is installed on the HVAC unit using the same hinges used to hinge the solar generator top. The grill cover has a glass opening for viewing while cooking and an electric light to light up the cooking grill. The grill surface tank top is a cooking surface installed on top of the HVAC's heat exchanger without its pressure seal and all air vents are covered with vent covers to thermally seal the HVAC unit. The grill mode also requires the pressure relief by-pass-valve to be closed to allow the water in the upper tank to vent via the vent pipe so that the fluid/water can reach temperatures above boiling. The grill surface is heated up as result of the grill tank top being in direct contact with the upper tank surface, therefore causing heat to transfer from the upper tank top to the grill surface when the upper tank is full of a hot water/fluid. The grill top also receives heat via convection as result of steam air circulating inside of the heat exchanger tank. 5) The network energy monitoring system uses electrical meters to measure the energy generated by an array of photovoltaic cells/solar panels and measures the energy consumed by all electrical loads. The data is collected by connecting electric meters to the solar generator to monitor the kilowatts hours of electricity generated. To measure the electric energy consumed an electric meter is connected to the output of the solar generator to measure the total kilowatt hours consumed by all the loads. Another meter is connected to solar generators storage batteries to measure the energy generated by the PV Array. To measure BTU's generated and the amount of hot water produced and consumed, a water meter is place in line with the solar water/fluid tank a long with a water temperature sensor. The water temperature is also measured inside the water tank of the HVAC system. The collected data is used to calculate the BTU's generated and BTU's consumed. The energy data is communicated through a wireless network (or hardwired network) to a centralized computer where the data is analyze, stored and graphically displayed to show data trends, 6) The Supervisory Control and Data Acquisition system utilizes a wireless network to send control signals via a touch screen control computer to the HVAC unit controller to control its devices and receives monitoring data over the wireless network from electronic devices and displays device statuses on a controls system screen map. The SCADA unit is also capable of wireless communication with mobile smart phones devices or handheld computers. The main HVAC unit can be configured to operate as the following appliances:

a. Refrigerator mode—In this mode the thermoelectric unit located in the lid of the HVAC enclosure with its fan pointing down inside of the upper tank generates cool/air in the upper tank. In this mode the upper tank is opened and is used to store items for refrigeration. The air vents are blocked to thermally seal the HVAC enclosure. The refrigerator temperature is monitored by the temperature sensor inside the upper tank and controlled by the HVAC computer controller. Air is circulated inside the upper tank via the thermoelectric unit's fan. To achieve cooler temperatures, the fan blower is turned to a low speed which will cause air in the lower chamber of the enclosure to circulate around the finned pipes to improve the efficiency of heat transfer which causes the refrigerator unit to cool better.

b. Air Purifier/Fan—Air filters can be installed inside the vents of the intake air vent and outlet vents to filter air in a room when the fan blower is running.

c. Drink Dispenser—With the HVAC unit configured as a standalone unit, the upper tank can be filled with any type of drink/liquid and dispensed via the inlet valve or outlet valve by gravity feed.

d. Pressure Cooker—With the HVAC unit configured as a standalone unit, and the grill tank top installed with its pressure seal mounted between the grill tank top and rim of the upper tank. The pressure relief blocking valve is closed and the vent blocking valve is closed. A small cooking pot with items that are require to be pressure cooked can be placed inside the upper tank and the tank top closed and secured in place with thumb screws or optional hinge clamps. The upper tank is pressurized when a fluid/water inside the upper tank is heated up using the heating elements.

e. Portable Pressurize Hot Water Supply can be achieved by either utilizing the solar hot water/storage tank or the HVAC units as standalone unit to supply pressurize hot water. A fluid/water pump is installed on either/both the solar water/fluid tank or HVAC unit to achieve a pressurize hot water source with a garden type hose. With a garden type hose connected to either the solar hot water tank or HVAC unit's outlet valve's with a water hose sprayer containing a pump switched mounted on the sprayer and wired to a pump, pressurize fluid can be achieved. An optional shower adapter can also be attached to the garden hose to function as a portable shower.

BRIEF DESCRIPTION OF DRAWINGS

FIG. 1 Portable Solar HVAC Assembly—Illustrates the complete assembly of the HVAC system. Shows the heat exchange assembly, thermoelectric unit assembly and fan blower motor being installed in an insulated enclosure.

FIG. 2 HVAC Enclosure—Illustrates parts of the insulated HVAC enclosure.

FIG. 3 DC/AC inverter Assembly—Illustrates power DC/AC inverter assembly.

FIG. 4 Thermoelectric Unit Assembly—Illustrates the complete assembly of the thermoelectric unit.

FIG. 5 Control Unit Assembly—Illustrates the control unit assembly.

FIG. 6 Heat Exchange Assembly—Illustrates the complete heat exchange assembly.

FIG. 7 Solar Generator Block Diagram—Describes the complete block diagram of the solar generator and uninterrupted power supply option.

FIG. 8 Overall HVAC System Schematic—Describes the overall power and controls schematic of the HVAC system.

FIG. 9 Portable Solar Hot Water Tank Front View—Illustrates the front view of portable solar hot water tank.

FIG. 10 Solar Hot Water Tank Rear View—Illustrates the rear view of the portable solar hot water tank.

FIG. 11 Solar Hot Water Tank Left View—Illustrates the left side of the solar hot water tank.

FIG. 12 Solar Hot Water Tank Right View—Illustrates the right side of the solar hot water tank.

FIG. 13 Portable Solar HVAC System—Illustrates all the major components of a complete portable HVAC system installed inside a home with hoses and cabling routed through duct work in a window in a home.

FIG. 14 Portable Solar Grill Assembly—Illustrates all the major components of a complete portable solar grill system installed inside a home with hoses and cabling routed through duct work in a window in a home.

DETAILED DESCRIPTION OF INVENTION

Description

The disclosed invention consists of the following major components. 1) Solar Hot Water Tank/Storage Tank 536, 2) Solar Generator 535, 3) Solar HVAC Unit 537, 4) Solar Grill 538, 5) Wireless Network Energy Monitoring System 361 and 6) Supervisor Control and Data Acquisition (SCADA) system 362. Also included is the following list of appliances that the HVAC system 537 can be configured to function as: a) refrigerator, b) air purifier, c) pressure cooker, d) drink dispenser, and e) pressurized hot water supply.

1) The solar water/fluid tank 536 is portable and on wheels 470 with cotter pins to secure the wheels in place 485 as described in FIGS. 9, 10, and 11. The body of the solar water/fluid tank has an insulated 495 frame 425; handle bar 430, fluid/water pump 509, thermocouple 491, fluid level 492, battery 510, water meter 516, electric heating element 490, Low emission glass 435, glass support moldings trim and seal 500 and a temperature control unit 515. There is an upper tank 440 and lower tank 475 that is fluidly and mechanically connected to a plurality of vertically mounted tube pipes 450. The solar hot water tank 536 has a pressure relief valve 445, an intake valve 420 and outlet valve 465 with standard type garden hose connectors (optional fix pipe for all connections) 565 that allow a garden hose 525 rated for hot water to connect to the solar water/fluid tank's 536 corresponding intake valve 420 or outlet valves 465 of the main HVAC unit. The solar hot water tank's 536 main function is to generate hot water from the sun's radiation and pump 509 it to the main HVAC unit 537. The solar water/fluid tanks 536 can be cascaded together using garden type hoses 525 to create any size hot water tank or storage tank 536. Furthermore, the solar water/fluid tank 536 can be configured to operate as a standalone unit to provide an independent supply of pressurized hot water via a garden hose 525 with an optional sprayer 570 with a switch 575 mounted on the sprayer 570 to activate a water/fluid pump 509 or a shower adapter 577 can be attached to the hose. The solar water/fluid storage tanks 536 utilize a black body (painted flat black) on all exposed metal objects to absorb all wavelengths of the sun's radiation to assist with heating up the heat exchanger pipes 450. There is low emission glass 435 mounted on the front of the tank 536. This glass 435 helps heat up the heat exchanger pipes 450 by allowing short wavelength infrared sunlight to pass through the glass to heat the heat exchange pipes 450 but reflects long wavelength in heat waves inside the tank 536 glass 435 to keep the tank's heat from escaping.

2) The solar generator 535 operates as a portable or fixed solar generator 535, and uninterruptible power supply to provide alternating current and alternating voltage to electrical loads. The solar generator 536 is the main power source for the HVAC unit 537 and solar hot water tank 536. The unit has two ways to charge the solar battery bank 325. The first automatic transfer switch 320 has an input from a battery charger 315 that is connected to a filtered 300 utility grid power source 275 while the second input of the transfer switch is from an array of photovoltaic cells/solar panels 335 connected to a battery charge controller 340. The output of the first automatic transfer switch 320 connects to a bank of solar storage batteries 325 for charging. When no solar charging is available or the batteries charge level is low, as an option the unit switches the charging source to the utility grid power 275. There is also a manual switch 345 for manually switching the first transfer switch 320 from either solar powered charge or grid powered charge. There is an optional second automatic transfer switch 305 that provides the electrical loads with the choice of utility grid power source 275 or AC power from a DC/AC inverter 330.

3) The Solar Powered HVAC unit 537 has an insulated enclosure 115 with a heat exchanger 534 that consist of a plurality of vertically mounted finned pipes 220 that are connected to an upper tank 225 and lower tank 270. The upper tank 225 is separated from the lower tank 270 by a plurality of finned tubes 220 fluidly and mechanically connected to both the upper tank 225 and lower tank 270. The upper tank 225 has a thermocouple sensor 235, an electric heating element 230, fluid level sensor 255, pressure sensor 256 mechanically mounted inside the upper tank 225. The upper tank 225 also has a garden hose 525 type with a garden hose connector intake valve 260 and pressure relief valve 265 with a valve 261 controlled vent pipe 262. In the heating mode, the HVAC unit 537 receives hot water via a water/fluid pump 509 mounted either on the solar hot water tank 536 or mounted on the HVAC unit 537. There is a garden hose 525 that connects from the outlet valve 465 on the solar water/fluid tank 536 to the intake valve 260 on the HVAC unit upper tank 225. The lower tank 270 of the HVAC has an outlet valve 195 with a garden hose connection 565 back to the intake valve 420 of the solar water/fluid tank 536. The HVAC temperature controllers 160 monitors the temperature (T1) of the water in the solar water/fluid tank 536 and the temperature of water in the HVAC upper tank 225 T3. If T1 temperature is lower than its preset temperature T2, and T3 temperature is below its preset temperature T4, then the HVAC unit 537 will activate its heating elements 230 to bring the water temperature T3 its to a preset temperature T4. If the temperature T1 of the water in the solar tank 536 is equal to or greater than its preset T2 temperature, then the HVAC temperature controller 160 will activate the fluid/water pump 509 for a predetermined amount of time (t) to refill the HVAC tank 537 with the water from the solar water/fluid tank 536. The heat exchanger 539 is heated up by the hot water/fluid inside of it that comes from either the solar water/fluid storage tank 536 or from activation of heating elements 230. There is a fan blower 190 that intakes outside air through the intake vents 15 and circulates the air through finned pipes 220 of the heat exchanger 539 where the air absorbs heat from the radiating heated finned pipes 220 and exits through the outlet vent 16. In the air conditioning mode, a thermoelectric unit 534 mounted inside the lid of the HVAC's enclosure 115 is used to cool the air in the upper tank 225 of the heat exchanger 539 with the grill tank top 240 of the heat exchanger 539 removed. Cold air flows inside the heat exchanger 539 from the thermoelectric unit 534 and cools the finned pipes 220 of the heat exchanger 539 by absorbing heat energy from the finned pipes 220. Therefore, when the fan blower circulates warm air flows into the intake vent 15 and across the cold finned pipes 220 of the heat exchanger 539, heat is transferred to the finned pipes to cool the air that arrives at the outlet vent 16. The HVAC unit creates condensation in both the air condition mode and refrigeration mode as result of warm air coming in contact with the heat exchanger finned pipes 220. The condensation is collected in a drip pan 200 located at the bottom of the enclosure with a drain line 205 that drains fluid to a bottle 215 via gravity feed or optional via a water/fluid pump 205. The drained fluid is stored in a water/fluid bottle 215. Moreover, ice cubes can be added to the opened upper tank 225 of the heat exchanger 539 to enhance the cooling effect of the HVAC unit.

4) The Solar Powered Grill 535 requires the solar generator 536 enclosure top 535 to be removed and mounted on top of the battery bank enclosure 325 using the same type of hinges and latches used on the HVAC enclosure. The grill covers 246 is installed on the HVAC unit 537 using the same hinges 247 and latches used to hinge the solar generator lid 535. The grill surface tank top 240 is installed without its pressure seal 248 and the air vents 15 & 16 are covered with vent covers 17 to thermally seal the HVAC enclosure 115. The grill mode also requires the pressure relief by-pass-valve 265 to be closed to block any water/fluid from coming in contact with the pressure relief valve. The vent valve is opened to allow the water in the upper tank 225 to vent via the vent pipe 262 so that the fluid/water in the upper tank can reach temperatures above boiling. The grill surface 245 is heated up as result of the tank top 240 being in direct contact with the upper tank 225 when it is full of hot water/fluid, therefore causing heat to transfer from the upper tank top 225 to the grill surface 245 via direct contact and from convection as result of hot air circulating inside of the upper tank.

5) The network energy monitoring system 361 uses electrical meters 390 & 391 to measure the energy generated by an array of photovoltaic cells/solar panels 335 and measures the energy consumed by the electrical loads 310. The data is collected by connecting electric meters 390 & 391 to the solar generator 535 to monitor the kilowatts hours generated. To measure the electric energy consumed, an electric meter is connected to the output of the solar generator or optionally to each individual electric load devices 310. To measure the BTU generated and the amount of hot water produced and consumed, a water meter 516 is place in line with the solar water/fluid tank 536 along with a water thermocouple 491. The water temperature is also measured inside the water tank 225 of the HVAC system 537 using thermocouple 235. The collected data is used to calculate the BTU's generated and BTU's consumed. An energy data report is communicated through a wireless network (or hardwired network) to a centralized energy monitoring computer 361 where the data is analyzing, stored and graphically displayed to show data trends.

6) The Supervisory Control and Data Acquisition (SCADA) system 362 utilizes a wireless network to send control signals to the HVAC unit controller 160 to control its devices and receives monitoring data over the wireless network 365 from electronic devices. There is a touch control pad with an electronic display on the HVAC unit 537 (not shown on the drawings) that allow an operator to control all the functions of the HVAC unit 537 and control the solar generator, heating, air conditioning, fan, refrigerator, air purifier, grill, pressure cooker and pressurized fluid supply. The SCADA system 362 is also capable of communicating with mobile handheld device like smart cell phones or handheld computers. The main HVAC unit 537 can be configured to operate as the following appliances:

a. Refrigerator mode—In this mode the thermoelectric unit 534 installed in the lid of HVAC enclosure 115 with its fan 95 pointing down inside of the upper tank 225 creates cool air using a thermoelectric cooling generator. The upper tank 225 is opened and is use to storage items for refrigeration. The air vents 15 &16 are blocked to thermally seal the unit. The refrigerator temperature is monitored by a thermocouple 235 located inside the upper tank 225 and controlled by the HVAC computer controller 155 or optionally via a touch pad and display unit not shown on the drawings.

b. Air Purifier/Fan—Air filters 17 can be installed inside the vents of the intake air vent 15 and outlet air vents 16 to filter air in a room when the fan blower is running.

c. Drink Dispenser—The HVAC upper tank 225 can be filled with any type of drink liquid and dispensed via the outlet valve 195 and or inlet value 260.

d. Pressure Cooker—In this mode the grill tank top 240 is installed with its pressure seal 248 mounted between the tank top 240 an upper tank 225. The pressure relief blocking valve is closed 266 and the vent blocking valve 261 is closed to create a pressurize enclosure inside the heat exchanger 539. A small cooking pot with items requiring pressurize cooking can be placed inside the upper tank 225 and then securing the grill tank top 240 closed with thumb screws 250 or optional hinge clamps 251. This step will allow the upper tank 225 to become pressurize when a fluid is heated up inside the upper tank 225 using heating elements 230.

e. Portable Pressurize Hot Water Supply can be configured by either utilizing the solar hot water tank 536 or the HVAC unit 537 to supply pressurized hot water. A fluid/water pump 509 can be installed on either on the solar water/fluid tank 536 or HVAC unit 537 to achieve a pressurized hot water supply. With a garden type hose 525 attached to the outlet valve of the HVAC unit, a shower adapter 577 can be attached to establish a means for showering or a water hose sprayer 570 with a switched mounted on it to activate a water/fluid pump can be attached to the hose to provide a mean to spray hot water.

SEQUENCE LISTING

None

What is claimed:

1. An all-in-one multi-appliance solar powered heating ventilating and air conditioner (HVAC) system comprising: a combined solar hot water tank (517) and storage tank (536) with a heat exchanger with vertical tube pipes (450) mechanically connected to an upper tank (440) and lower tank (475) with a fluid intake valve (420), a fluid outlet valve (465), a pressure relief valve (445), a thermocouple (491), a fluid level sensor (492), an electric heating element (490), a low emission (e)-glass (435), insulation (495), a frame (42), a handle bar (430), a plurality of wheels (470), fluid pump (509), pump battery (510), temperature controller (515), an outdoor controller enclosure (514), a fluid meter (516), an insulated hose (525), wherein said insulated combined solar hot water tank/ storage tank receives a fluid via said inlet valve and receives solar radiation from the sun via said low e-glass to cause a fluid in said heat exchanger to heat up or optionally heat up via said electric heating element with temperature being measured via thermocouple, fluid level being measured via said fluid level sensor and water flow being measured via said meter, said fluid can be pumped from said tank via said outlet valve using said pump to said solar HVAC exchanger; further comprising a solar HVAC heat exchanger assembly, consisting:

an insulated enclosure top (100), comprising: an air vent (15), outlet vent (16), a receptacle (25), an inverter enclosure (30), an inverter circuit board (35), cigarette lighter receptacle (40), a universal serial port (45), power switch (50), a DC power post (55), exhaust fan enclosure (60), a finned heat sink (65), a cooler fan (70), an insulation (75), a finned heat sink (80), an thermoelectric unit (85), a cool fan enclosure (90), a cooling fan (95), an insulated enclosure top (100), an insulator (105), a lead seal (106), a handle (110), an air filter (17), a vent block (18), a wheel axle (120), a control box enclosure (125), a wheel (130), a lower tank insulator (135), an upper tank insulator (140), a temperature controller (155), a support frame (165), a blower cage fan (180), a fan blower (190), an outlet faucet (195), a drip pan (200), a fluid line (205), a pump (210), a fluid bottle (215), a finned heat exchange pipe (220), an upper tank (225), an electric heating element (230), a heat exchange thermocouple (235), a room thermocouple (236), a tank top (240), a grill surface (245), a grill cover (246), a fluid sensor (255), a pressure sensor (256), an inlet valve (260), a vent valve (261), a vent pipe (262), a pressure valve, a block valve (266), a lower tank (270), wherein said solar HVAC heat exchanger can receive a hot or cold fluid from said solar tank/storage to produce hot or cold air as result of air circulating across heat exchange unit;

further comprising a solar generator, consisting: a grid power source (275), a main power switch (276), a solar tank power switch (277), a HVAC power switch (278), a disconnect switch (279), a power filter (300), a power wiring (301), a transfer switch (305), an electrical load, a meter by pass switch (311), a battery charger (315), a storage battery bank (325), an inverter (330), a solar panel (335), a solar battery charge controller (340), a manual transfer switch (345), a main computer (355), a remote terminal unit (360), a network energy manager (361), a SCADA system (362), a handheld device (363), a wireless network server (365), a direct current output (370), a generator electric meter (390), a load electric meter (391), a utility meter (392), an electric generator (393), wherein said solar generator produces electricity from said solar panels which can charge said solar batteries or be used to power electrical loads, wherein said solar generator can also power said inverter to produce AC electricity, wherein said solar generator can be connected to an external generator or a utility grid.

2. A solar HVAC system as in claim 1, wherein the forming of a solar grill further comprising:

a tank top, a grill cover, a grill hinge, a tank top seal, a grill cover glass and trim, a grill surface, a grill cover, a tank top seal, a grill cover seal, a grill cover glass with trim, a grill cover light and switch, a food rack, wherein said solar grill utilizes hot water from said solar water tank and electric heaters to generate hot water hot enough to allow said grill surface to heat up to temperatures high enough to grill ordinary foods or operate as a pressure cooker when the heat exchanger upper tank is filled with a compressible fluid and grill surface is closed pressure tight with seal between heat exchanger enclosure and grill surface.

3. An solar HVAC system as in claim 1, wherein the forming of an HVAC system and pressurized hot water supply further comprising:

a solar tank top assembly consisting: an equipment enclosure cover, an air vent, outlet covers, air filter, vent block, mounting screws, receptacle, inverter, inverter circuit board, a cigarette lighter, an USB port, a power switch, a DC power post, an exhaust fan enclosure, a finned heat sink, a cooler fan, an insulator, a finned heat sink, a thermoelectric unit, a cooling fan enclosure, an insulated enclosure top, an insulation, a lid seal, wherein said solar HVAC system utilizes a combination of a cold fluid from either a utility underground water source plus cooling from a thermoelectric unit to provide a circulating cold fluid through said heat exchanger to cool heated circulating air when in the A/C mode, wherein said solar HVAC system receives hot water from said solar hot water tank to circulate in said heat exchanger to heat cool circulating air when in the heating mode and purifies air when a filter is place over air vents, wherein said solar HVAC system operates in the refrigerator mode when the upper tank of said heat exchanger is used to store items that are cooled by thermoelectric unit located in the top cover, wherein said solar HVAC system provides pressurized hot water from either said solar HVAC heat exchanger or said solar hot water tank.

4. A solar HVAC system as in claim 1, wherein the forming of the control system for the HVAC system comprising:

an HVAC temperature controller, a hot fluid temperature controller, an A/C temperature controller, a blower motor controller, a pump controller, an energy manager, a supervisor control and data acquisition (SCADA) system;

wherein said solar HVAC system utilizes said HVAC temperature controller to control and monitor temperature of the HVAC unit and all appliances in coordination with the hot fluid temperature controller for the solar hot water tank to control temperatures inside upper tank, utilizes an energy manager to monitor all energy generated and energy consumed by the unit, and utilize a SCADA system to control and monitor all electronic devices via a wireless network.

* * * * *